US010930402B2

(12) United States Patent
Brun

(10) Patent No.: US 10,930,402 B2
(45) Date of Patent: Feb. 23, 2021

(54) NUCLEAR REACTOR WITH HEATING ELEMENTS HOUSED IN THEIR ENTIRETY IN AN INTEGRATED PRESSURIZER

(71) Applicant: Société Technique pour l'Energie Atomique, Villiers le Bacle (FR)

(72) Inventor: Michel Brun, Simiane-Collongue (FR)

(73) Assignee: SOCIÉTÉ TECHNIQUE POUR L'ENERGIE ATOMIQUE, Villiers le Bacle (FR)

( * ) Notice: Subject to any disclaimer, the term of this patent is extended or adjusted under 35 U.S.C. 154(b) by 436 days.

(21) Appl. No.: 15/741,210

(22) PCT Filed: Jul. 1, 2016

(86) PCT No.: PCT/EP2016/065506
§ 371 (c)(1),
(2) Date: Dec. 29, 2017

(87) PCT Pub. No.: WO2017/001663
PCT Pub. Date: Jan. 5, 2017

(65) Prior Publication Data
US 2018/0190391 A1 Jul. 5, 2018

(30) Foreign Application Priority Data

Jul. 1, 2015 (FR) ...................... 15 56218

(51) Int. Cl.
*G21C 1/09* (2006.01)
*G21C 1/32* (2006.01)
(Continued)

(52) U.S. Cl.
CPC ................. *G21C 1/09* (2013.01); *G21C 1/32* (2013.01); *G21C 13/028* (2013.01); *G21C 13/02* (2013.01); *G21C 17/116* (2013.01); *Y02E 30/30* (2013.01)

(58) Field of Classification Search
CPC . G21C 1/09; G21C 1/32; G21C 13/02; G21C 13/028; G21C 17/116
(Continued)

(56) References Cited

U.S. PATENT DOCUMENTS 2,457,596 A * 12/1948 Osterheld ................ H05B 3/06
392/497
6,810,836 B1 * 11/2004 Ferguson ................. F24H 1/40
122/249

(Continued)

FOREIGN PATENT DOCUMENTS

CN  103345949 A  10/2013
CN  104335286 A  2/2015
(Continued)

OTHER PUBLICATIONS

International Search Report, dated Sep. 21, 2016, in International Application No. PCT/EP2016/065506.

(Continued)

*Primary Examiner* — Jack W Keith
*Assistant Examiner* — Daniel Wasil
(74) *Attorney, Agent, or Firm* — Knobbe, Martens, Olson & Bear, LLP

(57) ABSTRACT

A nuclear reactor has a pressurizer housed in a vessel. Heating elements are completely housed in the pressurizer. The nuclear reactor has electrical conductors that are the only feature leaving the vessel through electrical penetrations. The nuclear reactor can be operated to produce energy. The production of energy can be stopped, and the vessel of the reactor can be opened for performing maintenance operations on elements of the pressurizer and other components of the reactor, including fuel assembly replacement. After performing maintenance operations, the vessel of the reactor can be closed and energy production resumed.

17 Claims, 3 Drawing Sheets

(51) Int. Cl.
*G21C 13/028* (2006.01)
*G21C 17/116* (2006.01)
*G21C 13/02* (2006.01)

(58) Field of Classification Search
USPC .................................................. 376/205, 307
See application file for complete search history.

(56) References Cited

U.S. PATENT DOCUMENTS

| 2008/0310578 | A1* | 12/2008 | Steltzlen | ................. | G21C 1/09 376/416 |
| 2013/0287157 | A1 | 10/2013 | Conway | | |
| 2013/0301779 | A1* | 11/2013 | Shargots | ................ | G21C 1/322 376/262 |
| 2013/0308740 | A1 | 11/2013 | Fatih | | |

FOREIGN PATENT DOCUMENTS

| CN | 205104238 U | 3/2016 |
| CN | 105654994 A | 6/2016 |
| EP | 0 271 890 A1 | 6/1988 |
| FR | 2 895 206 A1 | 6/2007 |
| JP | H04-269691 A | 9/1992 |
| WO | WO 2013/158538 A2 | 10/2013 |
| WO | WO 2013/158538 A3 | 10/2013 |
| WO | WO 2013/158697 A1 | 10/2013 |

OTHER PUBLICATIONS

International Preliminary Report on Patentability, dated Jan. 2, 2018, in International Application No. PCT/EP2016/065506.
Written Opinion, dated Sep. 21, 2016, in International Application No. PCT/EP2016/065506.

* cited by examiner

NUCLEAR REACTOR WITH HEATING ELEMENTS HOUSED IN THEIR ENTIRETY IN AN INTEGRATED PRESSURIZER

PRIORITY AND CROSS REFERENCE TO RELATED APPLICATIONS

This application is the U.S. National Phase application under 35 U.S.C. § 371 of International Application No. PCT/EP2016/065506, filed Jul. 1, 2016, designating the U.S. and published as WO 2017/001663 A1 on Jan. 5, 2017, which claims the benefit of French Application No. FR 15 56218, filed Jul. 1, 2015.

FIELD

The invention generally relates to integrated pressurizer nuclear reactors.

SUMMARY

More specifically, according to a first aspect, the invention relates to an integrated pressurizer nuclear reactor, of the type [comprising]:
  a vessel having a central axis;
  a pressurizer housed in the vessel, the pressurizer having a lower zone filled with a primary liquid and an upper zone filled with steam;
  a plurality of nuclear fuel assemblies, forming a core arranged in the vessel;
  a plurality of heating elements provided to heat the primary liquid filling the lower zone of the pressurizer;
  at least one current source;
  electrical conductors connecting each heating element to the electrical current source;
  a plurality of electrical penetrations, defining sealed passages through the vessel.

Such a reactor is for example known from US 2013/0308740. This reactor includes multiple anti-condensation heaters, arranged radially. The length of these anti-condensation heaters is limited by the radius of the vessel, and their diameter is limited so as not to increase the size of the orifices of the vessel in which they are engaged. This leads to high power densities and thicknesses of mineral insulators around each heating resistance at the technological limit. Consequently, the failure rates of the anti-condensation heaters are high, and lead to maintenance operations that are detrimental for the operation of the reactor.

In this context, the invention aims to propose a nuclear reactor with easier maintenance.

To that end, the invention pertains to an integrated pressurizer nuclear reactor of the aforementioned type, characterized in that the heating elements are completely housed in the pressurizer, each heating element being connected to one of the conductors via an electrical connection point placed inside the pressurizer, and in that only the electrical conductors leave the vessel through the electrical penetrations.

Thus, the heating elements are not received in orifices traversing the vessel. The crossings only receive the electrical conductors, and not the heating elements.

Due to the arrangement of the heating elements inside the pressurizer, the shape and section of the heating elements can be chosen more freely than when the heating elements are received in orifices of the vessel. This in particular makes it possible to elongate the heating elements and thus reduce the power density. Furthermore, the section of the heating elements can be increased, and consequently the thickness of electrical insulator can be increased.

The reliability of the heating elements is thus increased.

The nuclear reactor can also have one or more of the features below, considered individually or according to any technically possible combinations:
  the heating elements extend entirely in the lower zone of the pressurizer;
  each heating element extends in a plane substantially perpendicular to the central axis;
  the heating elements extend in at least one plane substantially perpendicular to the central axis;
  each heating element extends along an arc of circle centered on the central axis;
  the vessel comprises a dome, the nuclear reactor comprises a thermal insulating plate fastened to the dome, the dome and the thermal insulating plate defining the pressurizer between them, the heating elements being fastened to the thermal insulating plate;
  the vessel comprises a dome, the electrical penetrations traversing part of the dome defining the upper zone of the pressurizer;
  the vessel comprises a stationary lower part and an upper part releasably fastened to the lower part, the upper part comprising at least the dome;
  the nuclear reactor comprises between 3 and 15 heating elements;
  each heating element comprises an outer enclosure, a heating body housed in the outer enclosure, and at least one fin protruding on an outer surface of the outer enclosure;
  the heating elements are not arranged in an orifice of the vessel; and
  each heating element comprises an outer enclosure, a heating body housed in the outer enclosure, the outer enclosure being completely situated inside the pressurizer.

According to a second aspect, the invention relates to a method for operating a nuclear reactor having the features [below]:
  producing energy with the nuclear reactor;
  stopping the production of energy;
  opening the vessel of the reactor;
  performing maintenance operations on elements of the pressurizer, including at least one of the heating elements;
  in parallel, performing scheduled maintenance operations on other components of the reactor, in particular fuel assembly replacement operations;
  closing the vessel of the reactor and again producing energy with the nuclear reactor.

BRIEF DESCRIPTION OF THE DRAWINGS

Other features and advantages of the invention will emerge from the detailed description thereof provided below, for information and non-limitingly, in reference to the appended figures, in which.

DETAILED DESCRIPTION

Figure 1:
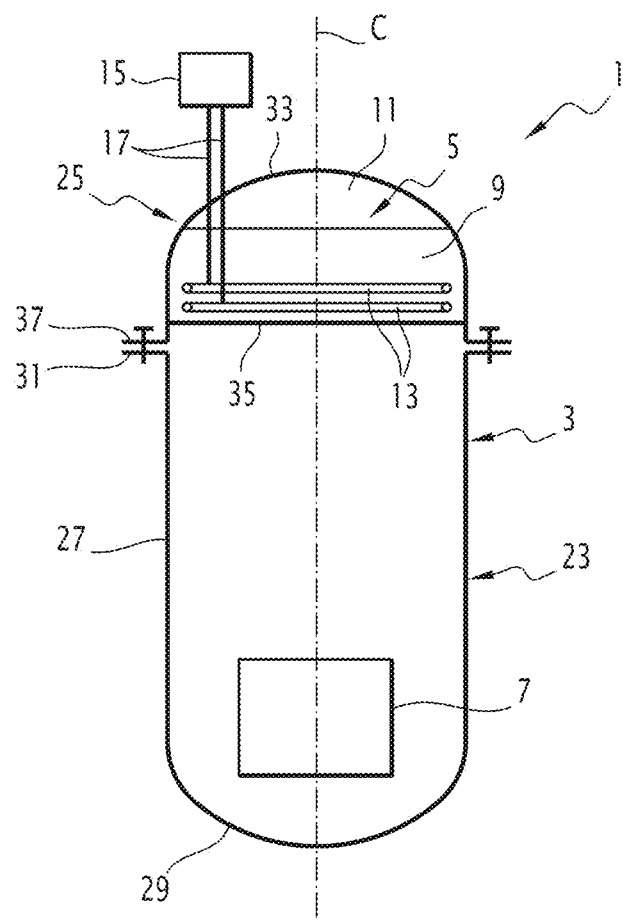
FIG. 1 is a simplified schematic illustration of an integrated pressurizer nuclear reactor according to the invention.

The nuclear reactor 1 shown in FIG. 1 is an integrated pressurizer pressurized water reactor (PWR). The nuclear reactor 1 is of the type known by the acronym SMR (small and modular reactor). Such reactors for example equip small nuclear facilities with a power of several hundred MWe. The nuclear reactor 1 includes:
- a vessel 3,
- a pressurizer 5 housed in the vessel 3, and
- a plurality of nuclear fuel assemblies, forming a core 7 arranged in the vessel 3.

As shown in FIG. 1, the vessel 3 has a substantially vertical central axis C. The terms "upper" and "lower" will be understood in the present description relative to the vertical direction.

The vessel 3 is substantially of revolution around the central axis C.

As indicated above, the pressurizer 5 is provided to control the primary liquid pressure in the primary circuit. In the reactor 1 shown in FIG. 2, of the SMR type, the primary circuit is completely housed inside the vessel. In other types of reactors, certain elements of the primary circuit are located outside the vessel and are connected to said vessel by circulation ducts.

The pressurizer 5 is said to be "integrated" inasmuch as it is formed by an upper volume of the vessel 3. It includes a lower zone 9 filled with the primary liquid, and an upper zone 11 filled with steam. The lower and upper zones 9 and 11 communicate, and form only one single continuous volume. The steam filling the upper zone 11 is constantly in thermohydraulic equilibrium with the primary liquid filling the lower zone 9.

The nuclear reactor further comprises a plurality of heating elements 13, provided to heat the primary liquid occupying the lower zone of the pressurizer.

The heating elements 13 are of the resistive type. Thus, the nuclear reactor includes at least one current source 15, and electrical conductors 17 connecting each heating element 13 to the current source 15.

According to the invention, the heating elements 13 are completely housed in the pressurizer 5.

Figure 3:
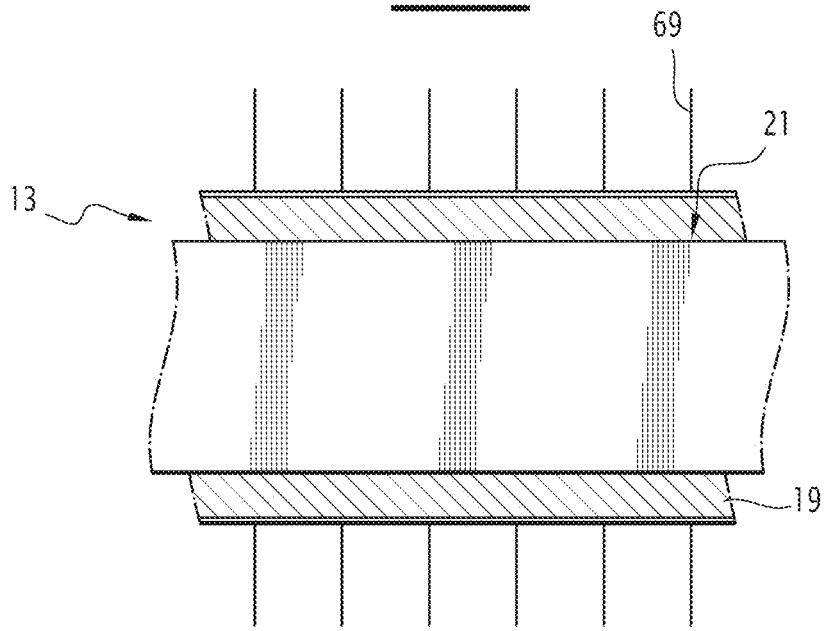
FIG. 3 is a partial sectional view of a heating element of the pressurizer of the nuclear reactor of FIG. 2.
Figure 2:
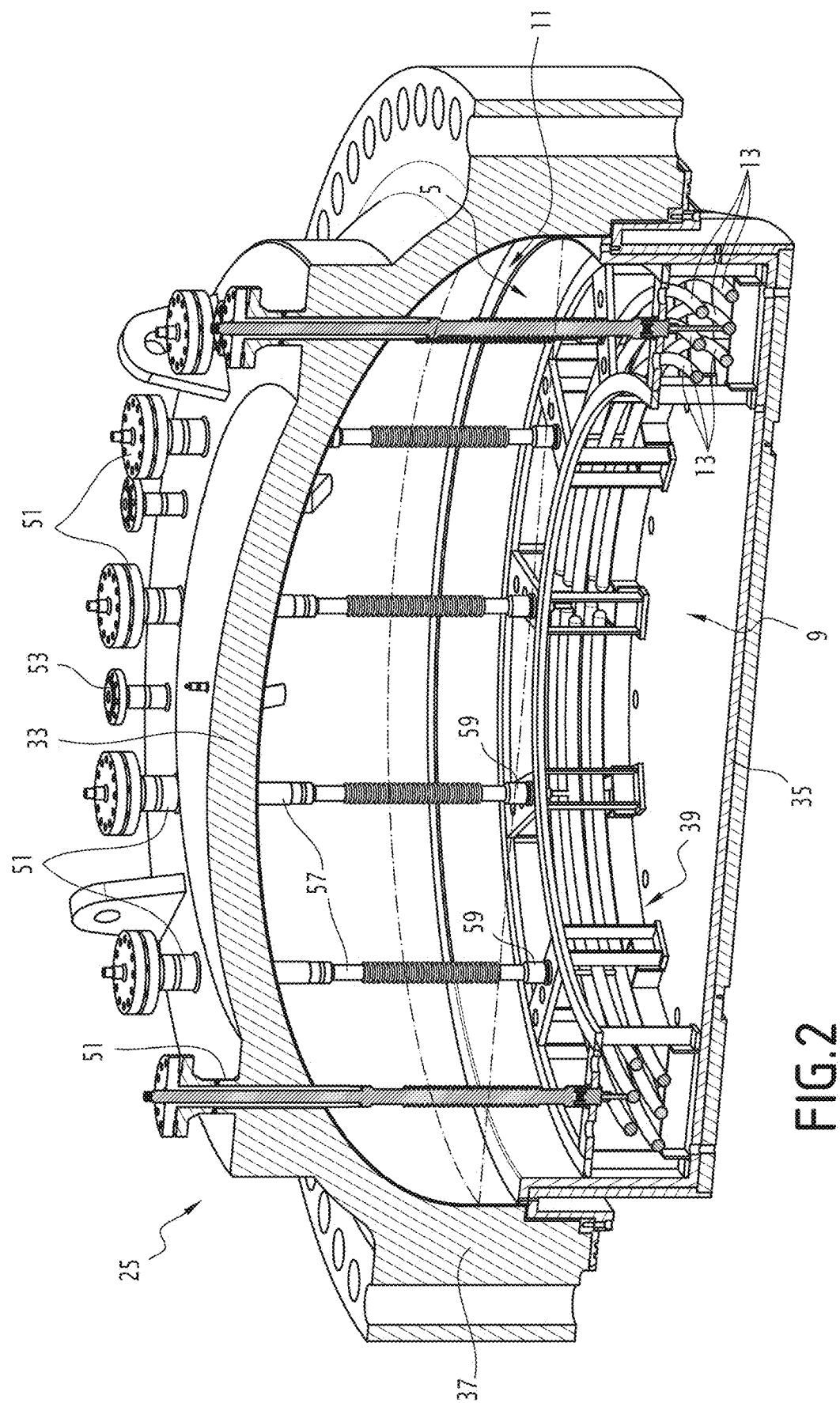
FIG. 2 is a perspective view of the pressurizer of the nuclear reactor of FIG. 1.

As shown in FIGS. 2 and 3, each heating element 13 includes an enclosure 19, a heating body 21 housed in the enclosure, each heating element 13 and therefore each heating body being electrically connected to one of the conductors 17. "Completely housed" in the pressurizer refers to the fact that the entire enclosure 19 is situated inside the pressurizer 5. Each heating element 13, through the heating body 21 and the enclosure 19, is connected to one of the conductors 17 via an electrical connection point placed inside the pressurizer. The connection point being placed inside the pressurizer, none of the portions of the enclosure 19 are thus engaged through the pressurizer and protrude outside the pressurizer and the vessel. Likewise, the entire heating body 21 is housed inside the pressurizer. Only the electrical conductors 17 leave the pressurizer.

The components performing the heating, i.e., the heating elements 13, are thus independent of the components ensuring the electrical penetration in the pressurizer, i.e., the connection points and the conductors 17.

Each heating element 13 can be disassembled relative to the conductor 17 to which it is connected.

As shown in FIG. 1, and more particularly in FIG. 2, each heating element 13 is arranged in a plane substantially perpendicular to the central axis C. In other words, each heating element 13 is arranged in a substantially horizontal plane.

Thus, each heating element 13 extends entirely in the lower zone 9 of the pressurizer, and is therefore completely submerged in the primary liquid. Such an arrangement makes it possible to configure the heating elements 13 very freely, and to give them any appropriate shape. It in particular makes it possible to impart a considerable length to the heating elements and increase the heat exchange surface with the liquid, while reserving installation zones for the other equipment connected to (or passing through) the dome of the pressurizer.

In one particularly advantageous embodiment, each heating element 13 extends along an arc of circle centered on the central axis C. Typically, the heating elements 13 are distributed in two rings, or three rings, or more than three rings. The number of heating elements 13 per ring varies. Thus, each ring can include two heating elements 13, or three, or more than three.

In one embodiment, the rings are superimposed on one another at the periphery of the pressurizer. This arrangement reserves a wide space at the center of the pressurizer, for example to install recesses for the control mechanisms.

In another embodiment, the heating elements 13 [are] arranged in several rings centered on the central axis C, positioned concentrically, in several circles with increasing radii over the entire surface and on a single level in order to promote heat exchanges.

According to another alternative, the heating elements 13 are not arranged in arcs of circle, but in any other shape appropriate for the heat exchanges based on the particular design of the reactor and the devices to be arranged in the pressurizer.

In one particularly advantageous embodiment, the heating elements 13 themselves are in the shape of an arc of circle. This means that the tube 19 is configured in an arc of circle. Alternatively, the heating element 13 is formed by a plurality of rectilinear segments placed in the extension of one another, these end-to-end segments approximately forming an arc of circle. In this example embodiment, successive rectilinear segments form a regular polygon.

The vessel 3 comprises a stationary lower part 23 and an upper part 25 releasably fastened to the lower part 23. The lower part 23 typically includes a cylindrical shroud 27 coaxial to the central axis C, closed at a lower end by a curved lower bottom 29. The shroud 27 ends at the top with a flange 31. Typically, the core 7 and part of the insides of the nuclear reactor are housed inside the lower part 23.

Furthermore, the upper part 25 includes a dome 33. The nuclear reactor 1 includes a so-called thermally insulating plate 35 arranged in the vessel and fastened to the dome 33. The dome 33 and the thermally insulating plate 35 define the pressurizer 5 between them.

The thermally insulating plate 35 is releasably fastened to the dome 33. It is substantially perpendicular to the central axis C.

At the thermally insulating plate 35, the upper part 25 of the vessel 3 has a free inner section with a determined shape, the thermally insulating plate 35 having a shape conjugated with said free inner section. Thus, the thermally insulating plate 35 extends over the entire free section. It is provided to physically and thermally insulate the upper volume of the vessel, which forms the pressurizer 5, from the lower volume of the vessel, in which the core, the steam generator(s), and a certain number of mechanisms, such as the control clusters for the reactivity of the core and the actuators provided to move those clusters, are housed.

The thermally insulating plate 35 is pierced with openings allowing the primary liquid to circulate between the upper volume of the vessel and the lower volume of the vessel. These openings are not shown in figures.

The upper part 25 of the vessel ends toward the bottom with a companion flange 37, provided to be fastened sealably and releasably to the flange 31. In the example embodiment shown in FIGS. 1 and 2, the companion flange 37 is directly secured to the dome 33. Alternatively, the upper part of the vessel includes a cylindrical shroud, extending the dome 33 downward, the companion flange 37 being secured to the shroud.

The heating elements 13 are fastened to the thermally insulating plate 35. Typically, they are fastened to an upper face of the thermally insulating plate 35, turned toward the pressurizer 5.

To that end, the nuclear reactor 1 includes a chassis 39, fastened to the thermally insulating plate 35, the heating elements 13 themselves being fastened to the chassis.

Furthermore, the nuclear reactor 1 includes a plurality of electrical penetrations 51 defining sealed passages through the pressurizer and through the vessel 3. These electrical penetrations 51 are electrical penetrations provided for the sealed passage of the electrical conductors 17 through the pressurizer and through the vessel. It is important to stress that only the electrical conductors 17 exit the pressurizer through the electrical penetrations 51. As indicated above, this means that the electrical connection points between the heating elements and the electrical conductors 17 are placed inside the pressurizer and therefore that the heating elements 13 do not exit the pressurizer, and therefore the vessel, through the electrical penetrations 51.

In the embodiment of the figures, each heating element 13 is not extractable from the pressurizer through the electrical penetration 51 of the electrical conductor 17 to which it is connected.

The nuclear reactor further includes fluid crossings 53, for example for the safety valves.

The electrical penetrations 51 are of any appropriate type. For example, they are of the type described in WO 2013/158697.

As shown in FIG. 2, the electrical penetrations 51 traverse part of the dome 33 defining the upper zone 11 of the pressurizer.

Thus, in case of leak at the electrical penetrations 51, the steam phase escapes through the electrical penetrations 51, and not the primary liquid, which is known to be more favorable in the safety analyses relative to the situation where the leak occurs in a crossing emerging in a lower zone 9 bathed by the primary liquid.

Typically, the nuclear reactor includes an electrical penetration 51 for each heating element 13.

Each electrical penetration 51 includes a tube 57 oriented substantially parallel to the axis C. This tube has a lower end 59 fastened removably to the chassis 39. This lower end 59 is closed off by a shutter, not shown, traversed sealably by the conductors 17 that connect to the heating element 13 served for the electrical penetration.

In the embodiments using heating elements traversing the vessel, the number of heating elements (generally several tens) is defined by the technological constraints applicable to these elements. On the contrary, in the context of the invention, the number of heating elements and the power of each heating element are chosen only to respond to the functional and safety requirements, in particular:

the different types of heating to be considered (heating of the primary liquid upon starting up the reactor, priority heating, pressure regulation, etc.);
the thermodynamic transitions allowed in case of damage of a heating element;
the redundancies required for safety reasons, etc.

Thus, typically, the nuclear reactor 1 comprises between three and fifteen heating elements 13, and preferably between six and twelve heating elements 13.

In the illustrated example, the nuclear reactor 1 includes twelve heating elements 13, each forming a half-circle.

The structure of a heating element 13 is shown in FIG. 3. As indicated above, this heating element comprises a cylindrical outer enclosure 19, and a heating body 21 placed inside the outer enclosure 19. The outer enclosure is made from a material compatible with the primary fluid, typically a stainless steel alloy. It has a circle, or oval, or any other shape section.

The heating body 21 typically includes one or more heating wires each having a resistive metal core covered with an electrically insulating layer.

Because the heating elements 13 are not arranged in an orifice of the vessel to allow them to be removed for maintenance reasons, these heating elements can be designed differently from the heating elements typically used in the pressurizers.

Indeed, the heating elements typically used in the nuclear reactor pressurizers must respect a large number of constraints.

The outer diameter of the heating element is limited, so as not to produce orifices in the vessel having a large diameter for the insertion and removal of these heating elements. Limiting the diameter of the orifices makes it possible to limit the significance of the leaks in case of accident.

The section of the resistive metal core cannot be decreased because it is determined by the quantity of current circulating in the heating element. Due to the different constraints above, the thickness of the electrically insulating layer is reduced to the minimum size that is technically possible. This causes a significant failure rate, which is detrimental to the operation of the pressurizer and extends the inter-cycle maintenance operations.

On the contrary, in the invention, because the heating elements do not have to be removed through an orifice with a limited diameter formed in the vessel, the design constraints for the heating elements are much less strict. It is thus possible to limit the outer diameter of the heating element 13, and therefore to increase the thickness of the insulating layer. This reduces the frequency and number of failures of the heating elements 13.

Consequently, a preventive inspection and/or exchange of the heating elements will be done during the long-term stoppage periods of the nuclear reactor, typically upon the expiration of one or more ten-year visits based on the supplier's recommendations. This operation, which takes place in the active component operating pool, is coupled with regulatory inspections of the insides of the pressurizer, outside the critical pathway of the long-term stoppage periods.

In the nuclear reactors of the state of the art, these maintenance operations of the heating elements are done primarily curatively during inter-cycle stoppages, i.e., the stoppages scheduled, inter alia, to replace part of the nuclear fuel assemblies, and participate in the coactivity on the critical pathway of these stoppages.

For example, in the invention, the outer enclosure 19 has an outer diameter larger than 50 mm. The electrically insulating layer has a thickness of several mm.

In order to improve the heat transfers between the heating element 13 and the primary liquid, the heating element advantageously bears at least one fin 69 protruding on an outer surface of the enclosure 19. For example, the fin 69 winds in a spiral around the outer enclosure 19, and is secured to said outer enclosure 19. Alternatively, the heating element includes a plurality of annular fins 69, regularly spaced apart from one another. The helical fin may also be replaced by any other type of outer shape, promoting heat exchanges between the heating element 13 and the primary liquid.

The fin(s) 69 are formed with the outer enclosure 19, or are attached on the outer enclosure 19.

The nuclear reactor 1 is arranged such that the thermally insulating plate 35 is separable from the dome 33, after separation of the stationary lower part 23 and the upper part 25 of the vessel of the reactor. This operation is typically done in the pool dedicated to operations on the components.

Typically, the thermally insulating plate 35 and the dome 33 are fastened to one another by removable fastening members, such as screws, that are accessible once the upper part of the vessel has been disassembled.

The chassis 39 and the heating elements 13 are integral with the thermally insulating plate 35. The crossings 51 are integral with the dome 33. The electrical penetrations 51 are separated from the chassis 39 before separation between the thermally insulating plate 35 and the dome 33.

Figure 4:
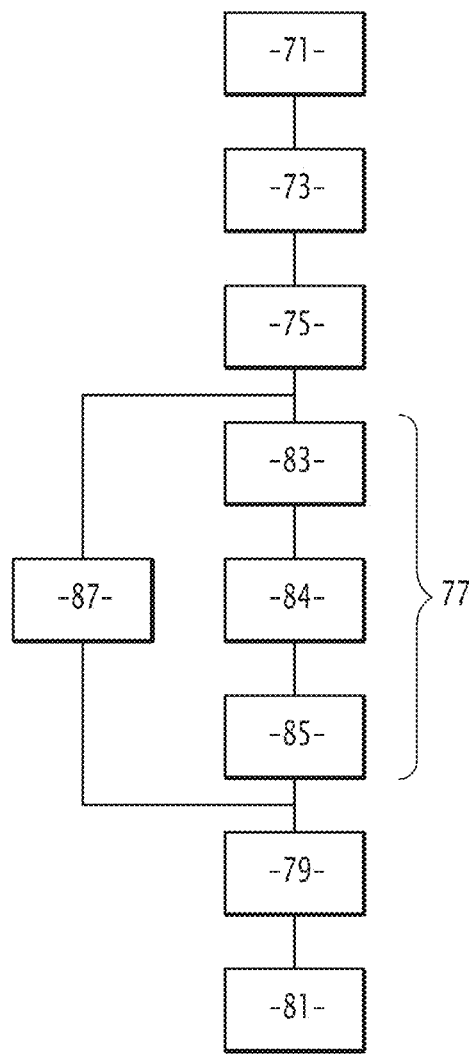
FIG. 4 is a step diagram of the operating method of the nuclear reactor of FIG. 1.

The operating method for the nuclear reactor described above will now be outlined, in reference to FIG. 4 regarding the stoppage periods, in particular the long-term stoppages. This method includes at least the following steps:
  producing energy with the nuclear reactor (step 71);
  stopping the production of energy (step 73);
  opening the vessel 3 of the reactor (step 75);
  performing maintenance operations on elements of the pressurizer, including at least one of the heating elements 13 (step 77);
  in parallel, performing scheduled maintenance operations on other components of the reactor, in particular fuel assembly replacement operations (step 87).
  closing the vessel 3 of the reactor (step 79);
  producing energy again with the nuclear reactor (step 81).

The step for opening the vessel of the reactor is carried out by separating the upper part 25 of the vessel 3 from the stationary lower part 23, the upper part 25 being transferred into a pool dedicated to operations on components.

The maintenance operation on the heating elements is coupled with other operations on the dome of the pressurizer (typically regulatory inspection operations) requiring this disassembly. It is therefore typically done in the pool for operations on components, and not on the reactor itself, as is the case in the standard designs. This arrangement therefore makes it possible to limit the interactions between said maintenance operations and those carried out as part of step 87, which take place on the reactor.

Step 77 includes a sub-step 83 in which the electrical crossings 51 are separated, then the thermally insulating plate 35 is separated from the dome 33.

After removal of the fastening members, the thermally insulating plate 35, bearing the chassis 39 and heating elements 13, and the dome 33, bearing the crossings 51, are separated from one another, so as to allow access to the heating elements 13.

The maintenance step 77 comprises a sub-step 84 during which the heating elements 13 are inspected and/or replaced, preventively if necessary.

Step 77 also includes a sub-step 85, during which the thermally insulating plate 35 is reassembled on the dome 33, then the electrical crossings 51 are reconnected to the heating elements.

The increased reliability of the heating elements makes it possible to space out the maintenance periods for these heating elements. Typically, the maintenance of the heating elements is provided preventively during the ten-year visits, and not curatively during the inter-cycles, i.e., each time the nuclear reactor is stopped to replace part of the fuel assemblies.

It is also important to emphasize that the reduction in the number of heating elements makes it possible to reduce the number of crossings of the vessel. It also makes it possible to simplify the electrical connections.

What is claimed is:

1. An integrated pressurizer nuclear reactor, the nuclear reactor comprising:
  a vessel comprising a central axis;
  a pressurizer housed in the vessel the pressurizer comprising a lower zone filled with a primary liquid and an upper zone filled with steam;
  a plurality of nuclear fuel assemblies, forming a core arranged in the vessel;
  a plurality of heating elements provided to heat the primary liquid filling the lower zone of the pressurizer;
  at least one current source;
  electrical conductors connecting each heating element to the at least one current source;
  a plurality of electrical penetrations, defining sealed passages through the vessel,
  wherein the heating elements are completely housed in the pressurizer, each heating element being connected to one of the conductors via an electrical connection point placed inside the pressurizer, and only the electrical conductors leave the vessel through the electrical penetrations.

2. The reactor according to claim 1, wherein the heating elements extend entirely in the lower zone of the pressurizer.

3. The reactor according to claim 1 wherein each heating element extends in a plane substantially perpendicular to the central axis.

4. The reactor according to claim 1 wherein the heating elements extend in at least one plane substantially perpendicular to the central axis.

5. The reactor according to claim 1, wherein each heating element extends along an arc of circle centered on the central axis.

6. The reactor according to claim 1, wherein the vessel comprises a dome, the nuclear reactor comprises a thermally insulating plate fastened to the dome, the dome and the thermally insulating plate defining the pressurizer between them, the heating elements being fastened to the thermally insulating plate.

7. The reactor according claim 1, wherein the vessel comprises a dome, the electrical penetrations traversing part of the dome defining the upper zone of the pressurizer.

8. The reactor according to claim 6, characterized in that the vessel comprises a stationary lower part and an upper part releasably fastened to the lower part, the upper part comprising at least the dome.

9. The reactor according to claim 1, wherein the nuclear reactor comprises between 3 and 15 heating elements.

10. The reactor according to claim 1, wherein each heating element comprises an outer enclosure, a heating body housed in the outer enclosure, and at least one fin protruding on an outer surface of the outer enclosure.

11. The reactor according to claim 1, wherein the heating elements are not arranged in an orifice of the vessel.

12. The reactor according to claim 1, wherein each heating element comprises an outer enclosure, a heating body housed in the outer enclosure, the entire outer enclosure being situated inside the pressurizer.

13. An operating method for a reactor according to claim 1, the method comprising:
   producing energy with the nuclear reactor;
   stopping the production of energy; opening the vessel of the reactor;
   performing maintenance operations on elements of the pressurizer, comprising at least one of the heating elements;
   in parallel, performing scheduled maintenance operations on other components of the reactor;
   closing the vessel of the reactor and again producing energy with the nuclear reactor.

14. The operating method according to claim 13, wherein the scheduled maintenance operations comprise fuel assembly replacement operations.

15. The reactor according to claim 10, wherein none of the portions of the outer enclosure are engaged through the pressurizer and protrude outside the pressurizer.

16. The reactor according to claim 1, wherein the heating elements are independent of the connection points and of the electrical conductors.

17. An integrated pressurizer nuclear reactor, the nuclear reactor comprising:
   a vessel comprising a central axis;
   a pressurizer housed in the vessel the pressurizer comprising a lower zone filled with a primary liquid and an upper zone filled with steam;
   a plurality of nuclear fuel assemblies, forming a core arranged in the vessel;
   a plurality of heating elements provided to heat the primary liquid filling the lower zone of the pressurizer;
   at least one current source;
   electrical conductors connecting each heating element to the at least one current source;
   a plurality of electrical penetrations, defining sealed passages through the vessel,
   wherein the heating elements are completely housed in the pressurizer, each heating element being connected to one of the conductors via an electrical connection point placed inside the pressurizer, and in that only the electrical conductors leave the vessel through the electrical penetrations,
   wherein the vessel comprises a dome, the plurality of electrical penetrations traversing a part of the dome defining the upper zone of the pressurizer, and
   wherein the plurality of electrical penetrations traverse said part of the dome in a direction of penetration that is substantially parallel to the central axis.

* * * * *